Patented Nov. 22, 1949

2,488,883

UNITED STATES PATENT OFFICE 2,488,883

POLYMERS OF THE CONDENSATION PRODUCT OF FORMALDEHYDE WITH UNSATURATED ESTERS OF KETOCARBOXYLIC ACIDS

Edward C. Shokal, Oakland, and Paul A. Devlin, San Francisco, Calif., assignors to Shell Development Company, San Francisco, Calif., a corporation of Delaware No Drawing. Application June 9, 1947, Serial No. 753,580

13 Claims. (Cl. 260—64)

1

This invention relates to a new class of polymers. More particularly the invention relates to the polymerization of the condensation products of formaldehyde with an unsaturated ester of a ketocarboxylic acid, and to the resulting polymers thereof.

More specifically the invention may be described as relating to the condensation of formaldehyde with an unsaturated ester of a ketocarboxylic acid, and to the polymerization of the resulting condensation product to produce a resinous material having the highly desired characteristics of drying readily in air to form resins having hard, flexible surfaces with a good general resistance to physical and chemical action. Such polymers of the unsaturated esters of ketocarboxylic acids may be produced economically on a commercial scale and used for a great many industrial purposes for which the inferior ketocarboxylic acid esters of the art are entirely unsuited.

Esters of ketocarboxylic acids have in general shown promise in the production of resinous products of commercial value. However, many of the polymers of the esters of ketocarboxylic acids have certain undesirable characteristics which prevent them from being used for many industrial purposes. Many of the esters, for example, polymerize to very soft materials, which are difficult if not impossible to harden to the strength and hardness desired for commercial resins. In general they may be hardened only by long and expensive curing processes which usually result in an embrittlement of the final product. Many applications of industrial resins demand a hard, flexible surface of the product so the polymers of the unsaturated ketocarboxylic acid esters find little use despite their favorable characteristics of having a low refractive index, infusible nature and good general resistance to chemical action.

It is an object of the invention, therefore, to provide polymers of unsaturated esters of ketocarboxylic acids which dry readily in air to form resins having a hard, flexible surface. It is a further object of the invention to provide polymers of the unsaturated ketocarboxylic acid esters which have a hard, flexible surface as well as retaining many of the special characteristics of the unsaturated ketocarboxylic acid ester polymers such as low refractive index, infusibility and good general resistance to chemical action. Other objects of the invention will be apparent from the detailed description given hereinafter.

It has now been discovered that unsaturated esters of ketocarboxylic acids may be polymerized to resins having a hard, flexible surface by the novel method of first condensing the unsaturated ester with formaldehyde and polymerizing the resulting condensation product. It has been further discovered that the resins produced by the polymerization of the condensation product of formaldehyde with the unsaturated esters of ketocarboxylic acids not only have a hard, flexible surface but also retain, in general, the special characteristics of the ketocarboxylic acid ester polymers such as their low refractive index, infusibility, and resistance to chemical action. Such polymers make ideal commercial resins and find great utility in many industrial applications discussed more completely hereinafter.

The unsaturated esters of ketocarboxylic acids used in the production of the polymers of the invention may be broadly described as esters of unsaturated alcohols and ketomonocarboxylic acids and ketopolycarboxylic acids. The ketocarboxylic acids are organic acids having in the molecule at least one carboxyl group which is separated from a keto group by a chain of not more than four carbon atoms of aliphatic character.

A preferred group of the ketocarboxylic acids are those having the carboxyl group separated from the keto group by a chain of three carbon atoms of aliphatic character. They may be represented by the structure (I) 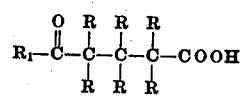

wherein $R_1$ is an organic radical attached to the keto group through a carbon atom, preferably a hydrocarbon radical, which may or may not be substituted by a hydroxy, alkoxy, carboxy or like group. Each R is the same or a different substituent selected from the group consisting of a hydrogen atom or an organic radical, preferably a hydrocarbon radical, which may or may not be substituted by hydroxy, alkoxy, carboxy, or like groups. The hydrocarbon radical may be saturated or unsaturated and may be aliphatic or alicyclic in character.

Examples of hydrocarbon radicals which $R_1$ and R may represent in the above structural formulae for the preferred ketocarboxylic acids are methyl, ethyl, propyl, isopropyl, n-butyl, isobutyl, sec-butyl, tert-butyl, n-pentyl, hexyl, n-octyl, iso-octyl, n-decyl, iso-decyl, dodecyl, tetradecyl, cetyl, stearyl, trimethyl octadecyl, allyl, methallyl, crotyl, methyl vinyl carbinyl, butenyl, pentenyl, hexenyl, propargyl, oleyl, cinnamyl, cyclopentyl, ethyl cyclohexyl, cyclopentenyl, cyclohexenyl, vinyl cyclohexenyl and the like. These radicals may be substituted with other elements or groups such as the hydroxyl, nitro, carbonyl, cyano and sulfolanyl radicals. Representative examples of the substituted radicals are nitroethyl, hydroxycyclohexyl, hydroxyethyl and cyanobutyl.

In addition to the hereinabove listed monovalent radicals, divalent radicals are also suitable. In such cases the general structure may contain a closed cycle illustrated by the following formula of the preferred acids (II)    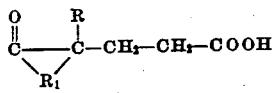

wherein $R_1$ is a divalent organic radical attached to the keto group through a carbon atom, preferably a divalent hydrocarbon radical, which may or may not be substituted, and R is a member of the group consisting of a hydrogen atom or a monovalent organic radical. Preferred organic radicals represented by R are substituted or unsubstituted hydrocarbon radicals. Representative examples of the preferred substituted or unsubstituted hydrocarbon radicals are methyl, ethyl, propyl, n-butyl, hexyl, n-decyl, tetradecyl, allyl, hexenyl, cyclohexyl, cyclohexenyl, nitroethyl, hydroxycyclohexyl, cyanopentyl and the like. $R_1$ preferably contains a chain of three or four atoms between the free valences of the radical. Examples of suitable divalent radicals will be apparent from the examples of esters given hereinafter.

A particularly desirable subgroup of the preferred group of ketocarboxylic acids are those having the general structural formula

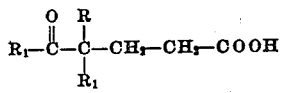

wherein each $R_1$ is the same or different alkyl radical containing from 1 to 15 carbon atoms and R is a carboxy-substituted alkyl radical containing from 1 to 18 carbon atoms. The alkyl radicals represented by R and $R_1$ may be saturated or unsaturated. Examples of the radicals represented by R are 2-carboxyethyl, 3-carboxybutyl, 5-carboxypentyl, 5-carboxy-3-hexenyl, 3-carboxy-5-octenyl and 9-carboxydecyl. Examples of the radicals represented by $R_1$ are methyl, butyl, pentyl, pentenyl, decyl, allyl, butenyl, hexenyl, and octenyl.

Representative examples of the ketocarboxylic acids the unsaturated esters of which are employed in the production of the novel polymers and resins of the invention are:

Gamma-oxy-pentanoic acid
Delta-oxy-pentanoic acid
Gamma-ethyl-delta-oxy-pentanoic acid
Beta,beta-dibutyl-gamma-oxy-pentanoic acid
Beta-ethyl - gamma-pentyl-delta-oxy-pentanoic acid
Beta - hexyl-gamma,gamma - diisopropyl-delta-oxy-pentanoic acid
Beta - allyl - gamma-hexyl-delta-oxy-pentanoic acid
Alpha-propyl-beta-methyl-delta-oxy-pentanoic acid
Gamma(2-oxy-cyclohexyl) pentanoic acid
Gamma(2-oxy-4-propyl-cyclohexyl) pentanoic acid
Gamma(2 - oxy-4-butyl - cyclopentyl) pentanoic acid
Gamma - isopropenyl - delta - tolyl - delta - oxypentanoic acid
Gamma,gamma - bis - (2 - hydroxybutyl)-delta-oxy-pentanoic acid Examples of the preferred ketocarboxylic acids are the following:

Gamma-acetyl-gamma-butyl pimelic acid
Gamma-propionyl - gamma - isopropenyl suberic acid
Gamma-acetyl-gamma-allyl azelaic acid
Gamma-hexanoyl-gamma-vinyl pimelic acid
Gamma-acetyl-gamma-isopropenyl pimelic acid
Gamma-octanoyl-gamma-isopropenyl sebaic acid
Gamma-acetyl-gamma-pentyl azelaic acid
Gamma-hexanoyl-gamma-butyl sebaic acid
Gamma-propionyl-gamma-methallyl pimelic acid The above-described ketocarboxylic acids may be produced by any suitable method. One suitable method and the one more preferred, is to treat a ketone containing an active methylene group with an unsaturated nitrile, preferably in the presence of a strong alkaline catalyst such as trimethylbenzyl ammonium hydroxide or potassium hydroxide, to produce the cyanoethylation products and hydrolyzing said products to the corresponding carboxylic acids. Such a process is illustrated by the following reaction showing the production of the cyanoethylation products in the preparation of delta-methyl-delta-oxy-pentanoic acid.

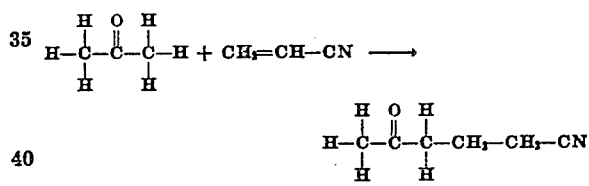

The conditions for the reactions are set forth in detail in our copending application No. 536,192, dated May 18, 1944 and in U. S. Patent No. 2,342,606, The unsaturated alcohols which may be used to esterify the ketocarboxylic acids are described broadly by the formula R—OH wherein R is a hydrocarbon radical which may or may not be substituted by hydroxy, alkoxy or like groups and contains at least one unsaturated linkage between two carbon atoms of aliphatic character, one of which is not more than two carbon atoms removed from the carbon atom bearing the hydroxyl group.

One subgroup of the above-described unsaturated alcohols are those termed "vinyl-type" alcohols represented by the following general formula

wherein each R may be the same or different substituent selected from group consisting of a hydrogen atom, halogen atom or a substituted or unsubstituted hydrocarbon radical. Examples of the vinyl-type alcohols are vinyl alcohol, isopropenol, hexen-1-ol-1, propen-1-ol-1, buten-1-ol-1, cyclopenten-1-ol-1, etc. Vinyl alcohol as well as some of the other vinyl-type alcohols have never actually been isolated, and therefore, require special methods, discussed hereinafter, for the preparation of their esters.

Another subgroup of the unsaturated alcohols are the compounds having an unsaturated linkage between two carbon atoms of aliphatic character, one of which is attached directly to a saturated carbon atom which in turn is attached directly to an alcoholic hydroxyl group, said unsaturated linkage consisting of a triple bond. Such compounds may be represented by the general formula

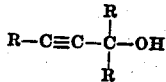

wherein each R is the same or different substituent selected from group consisting of a hydrogen atom, halogen atom or a substituted or unsubstituted hydrocarbon radical. Such alcohols may be represented by propargyl, pentyn-3-ol-2, 2-methyl-hexyn-3-ol-2, etc.

The more preferred group of the unsaturated alcohols which may be used to esterify the ketocarboxylic acids, however, are those termed "allyl-type" alcohols. Allyl-type alcohols are defined as unsaturated alcohols having a double bond between carbon atoms of aliphatic character, one of which is joined directly to a saturated carbon atom which in turn is attached to an alcoholic hydroxyl group. They have a structure which may be represented by the general formula

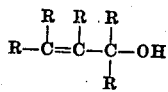

wherein each R is the same or different substituent selected from group consisting of a hydrogen atom, halogen atom or a substituted or unsubstituted hydrocarbon radical. Allyl-type alcohols may also be designated as beta-gamma, olefinic unsaturated alcohols, wherein the carbon atom bearing the alcoholic hydroxyl group is called the alpha carbon atom. Examples of the allyl-type alcohols are allyl alcohol, crotyl alcohol, tiglyl alcohol, 3-chloro-buten-2-ol, cinnamyl alcohol, hexadien-2,4-ol-1, hexadien-2,5-ol-1, 2-methyl-hexen-2-ol-1, 2-methyl-penten-2-ol-1, 3,7-dimethyl-octadien-2,7-ol-1, cyclopenten-2-ol-1, cyclohexen-2-ol-1, etc.

A particularly preferred group of the allyl-type alcohols are those beta-gamma, olefinic unsaturated alcohols of the above-described general formula wherein each R is a member of the group consisting of hydrogen atom or a short-chained hydrocarbon radical, the total number of carbon atoms in the alcohol varying from 3 to 18. Examples of the preferred allyl-type alcohols are the following: allyl alcohol, methallyl alcohol, ethallyl alcohol, 2-propylallyl alcohol, buten-1-ol-3, penten-1-ol-3, hexen-1-ol-3, 3-methyl-buten-1-ol-3, 3-methyl-penten-1-ol-3, 2-methyl-buten-1-ol-3, 2,3-dimethyl-buten-1-ol-3, hepten-1-ol-3, 4-methyl-hexen-1-ol-3, 5-methyl-hexen-1-ol-3, octen-1-ol-3, 4,4-dimethyl-penten-1-ol-3, 3-phenyl-propen-1-ol-3, 3-tolyl-propen-1-ol-3, 4-phenyl-buten-1-ol-3, 3-naphthyl-propen-1-ol-3, 4-chloro-buten-1-ol-3, pentadiene-1,4-ol-3, hexen-1-yn-5-ol-3.

The esterification of the ketocarboxylic acids with the unsaturated alcohols may be accomplished by a variety of methods. One method comprises the direct esterification of the acid with the unsaturated alcohol, preferably in the presence of an esterification catalyst such as an alkali metal alcoholate, a strong mineral acid or the like. Another method comprises ester exchange involving an ester of the acid with a lower alcohol, e. g. a lower saturated aliphatic alcohol, and an ester of an unsaturated alcohol with a lower acid, e. g. a lower saturated aliphatic acid, the reaction being preferably conducted in the presence of an esterification catalyst.

In the case of the esterification of the ketocarboxylic acids with certain vinyl-type alcohols special methods must be employed as discussed hereinabove. The more preferred method for the production of vinyl-type esters is to react the ketocarboxylic acid with acetylene in the presence of a mercuric salt such as mercuric sulfate. Exact procedure for such a reaction is set forth in U. S. Patent No. 1,084,581. Other methods consist of treating the vinyl-type halide with the sodium or silver salt of the ketocarboxylic acid.

When employing a ketopolycarboxylic acid all of the carboxyl groups may be esterified by the same or different unsaturated alcohols or one or more of the carboxyl groups may be esterified by an unsaturated alcohol and the remaining carboxyl groups may be esterified by saturated alcohols. The more preferred esters of the keto-polycarboxylic acids are those wherein all of the carboxyl groups have been esterified by unsaturated alcohols.

The following are representative examples of the unsaturated esters of ketocarboxylic acids to be used in producing the polymers of the present invention:

Ally delta-oxy-pentanoate
Methallyl delta-butyl-delta-oxy-pentanoate
Diallyl gamma-acetyl-gamma-butyl adipate
Dicrotyl gamma-propionyl-gamma-pentyl pimelate
Dimethallyl gamma-pentanoyl - gamma - hexyl suberate
Methallyl gamma (2-oxycyclohexyl) pentanoate
Diallyl gamma-acetyl-gamma-isopropenyl pimelate
Dicrotyl gamma-hexanoyl-gamma-allyl suberate
Dimethallyl gamma-acetyl-gamma-butenyl sebacate
Diallyl gamma-octanoyl-gamma-ethyl pimelate
Crotyl gamma,gamma-dibutyl-delta-oxy - pentanoate
Methallyl beta-ethyl-gamma-hexyl-delta - oxy-pentanoate
Cinnamyl gamma-isopropenyl-delta-oxy - pentanoate
Methallyl gamma-(3-chlorophenyl)-delta-oxy-pentanoate
Dicrotyl gamma-(2-hydroxybutyl)-delta-oxy-pimelate
Dimethallyl gamma-acetyl-gamma-isopropenyl pimelate The above-described unsaturated esters of ketocarboxylic acids are first condensed with formaldehyde to produce condensation products which in turn are polymerized to the desired resins. The unsaturated esters may be condensed singly with the formaldehyde or a mixture of two or more of the unsaturated esters may be reacted with formaldehyde. The unsaturated esters employed in the condensation reaction may be in the monomeric form or in the partially polymerized state, preferably the monomeric form. The term "partially polymerized" is meant to include the physical state existing between the monomeric state and the state of being substantially completely polymerized.

The formaldehyde employed in the condensation reaction is preferably used in the trimer form termed "trioxane." Satisfactory results are also obtained when the formaldehyde is employed in the monomeric form either in the gaseous state or in aqueous solutions of various concentrations. Other polymeric forms of formaldehyde such as the solid form termed "paraformaldehyde" may also be employed in the condensation reaction. Compounds other than formaldehyde may be used providing they contain the characteristic structure of formaldehyde, i. e. containing two active hydrogen atoms in the vicinity of an oxygen atom joined to a carbon atom. Suitable substitutes for the formaldehyde in the condensation reaction are the dialdehydes such as glyoxal. However, "trioxane" is the more preferred compound to be used in the reaction because of its relatively low cost and ready attainability.

The proportion of the reactants used in the condensation process may vary over a wide range. Amounts of aldehyde to be combined with the unsaturated esters may vary over a range of about 5% to about 95% by weight of total reactants and still produce resinous products which may be polymerized to resins having the desired characteristics. Proportions of aldehyde varying from about 15% to about 70% by weight of total reactants and amounts of unsaturated esters of ketocarboxylic acid varying from about 85% to about 30% by weight of total reactants produce exceptionally fine resins and such range of proportions of reactants are the more preferred for the reaction. The exact amount of each reactant to be used to produce the most superior resins, however, can readily be determined for each individual case.

The condensation reaction may be conducted in the presence or absence of solvents. The solvent if used, may be a solvent for the reactants and product or a solvent for the reactants and a non-solvent for the condensation product. Suitable solvents include toluene, dioxane, methylacetate, hexane, etc., and mixtures thereof.

The condensation reaction may be conducted in the liquid or vapour phase depending upon the nature of reactants, etc. The liquid phase is the more preferred medium for the reaction as the conditions are much easier to maintain and, in general, better yields are obtained.

The temperature for the reaction may vary over a wide range depending upon the conditions employed. In most cases the reaction may commence at a temperature as low as about 80° C. In general, the maximum temperature will not exceed about 250° C. but some cases may require a temperature above the range. A preferred temperature range is between about 100° C. and about 200° C. However, higher or lower temperatures may be used if needed or desired.

Condensation catalysts may be employed, if desired, to hasten the condensation of the aldehyde with the unsaturated esters of ketocarboxylic acid. Zinc chloride and hydrochloric acid have proved to be exceptionally fine catalysts in this regards. The amount of the catalyst used will depend upon the activity of the catalyst, the type of reactants used, the speed of reaction desired, etc., but in general, the amount should range from about .1 to about 2 moles for every 100 moles of total reactants employed.

The reaction may be conducted in the presence or absence of air, however, in some cases it may be desirable to conduct the condensation under a blanket of an inert gas such as nitrogen. Atmospheric, reduced or superatmospheric pressures may be employed.

The condensation reaction is executed in any convenient type of apparatus enabling intimate contact of the reactants, heating of the mixture and final separation of the condensation product from the reaction medium. The process may be carried out in batch, semi-continuous or continuous operation.

The condensation product resulting from the reaction of the formaldehyde with the unsaturated ester may be removed from the reaction medium after the completion of the reaction by any suitable means comprising such steps as, for example, distillation, washing, solvent extraction, filtration and the like.

The resulting condensation products are, in general, viscous liquids of a light brown or reddish color depending upon the reactants employed. The liquids show air drying properties and are readily polymerized in a short time to resins having hard, flexible surfaces.

The condensation product may be polymerized alone or in admixture with other already formed plastics, including natural resins, cellulose derivatives and synthetic resins. Other modifiers, including plasticizers, stabilizers, lubricants, dyes, pigments and fillers, may be added to the condensation product prior to polymerization or may be added to the partially polymerized condensation product during polymerization, provided they do not chemically react with or otherwise adversely affect the ingredients of the reaction mixture. Otherwise, these modifiers may be added following polymerization. The nature and amount of the modifiers used will depend upon the particular ketocarboxylic acid esters used in producing the condensation product, upon the method of polymerization and upon the intended use of the product.

The condensation product may be polymerized in bulk in the presence or absence of solvent or diluent. The solvent, if used, may be a solvent for the reactants and polymer or a solvent for the reactants and a non-solvent for the polymer. Emulsifying, granulating and wetting agents may be present. It is also possible to polymerize the condensation product while it is dispersed in the interstices in the fibrous material such as a fabric. In all such cases the polymerization may be either continuous or discontinuous and may be conducted at atmospheric, superatmospheric or reduced pressure.

The polymerization is usually energized by heat, although both heat and light can be used. Temperatures of about 60° C. to about 200° C. are preferred, however, higher and lower temperatures may be used if desired or necessary.

Catalyst may be added to hasten the polymerization if desired. The preferred catalysts are those which are soluble in the polymerizable compounds. Benzoyl peroxide has been found very satisfactory. Other polymerization catalysts are acetyl peroxide, benzoyl acetyl peroxide, lauryl peroxide, dibutyryl peroxide, succinyl peroxide, sodium peroxide, barium peroxide, tert-alkyl hydroperoxides such as tert-butyl hydroperoxide, peracetic acid, perphthalic acid, etc. If desired mixtures of the polymerization catalyst may be used. The amount of the catalyst used will vary under the various conditions but ordinarily will be between about 0.01% to about 5% by weight of the material being polymerized, although it is not necessary to limit this range. In some cases it may be desirable to conduct the polymerization in the concurrent presence of both a catalyst and an inhibitor of polymerization for the purpose of controlling the rate thereof or of producing a product of certain desired properties.

The polymerization reaction can be carried to completion without substantial interruption or it may be stopped at any point short of completion. Incomplete polymerization may be used to produce products which may be further worked and eventually substantially completely polymerized. The product may, for instance, be transferred to a mold of any desired configuration and again subjected to polymerization conditions. The unreacted materials may be separated from the final polymer by solvent extraction, distillation or other methods. The separated polymers may then be worked up in any known or special manner.

The polymers of the invention are characterized by their air drying properties which enable them to dry rapidly to a hard, flexible surface. They are further characterized by their low refractive index, infusibility and general resistance to chemical action. When completely polymerized the resins may be made into the form of turnery shapes, sheets, rods, tubes, thin films, filaments, fibers, etc. Their resistance to chemicals makes them desirable as coatings for cans for storing fruit, juices, etc. The resins find further use in the production of buttons, pen-holders, cups, boxes, and other objects requiring a slight flexible nature. They may also be used in the production of glass substitutes, in the preparation of laminates, in the production of paints, enamels, textile assistants, etc.

To illustrate the manner in which the above-described invention is to be carried out the following examples are given. It is to be understood, however, that the examples are for the purpose of illustration and the invention is not to be regarded as limited to the specific unsaturated ester of ketocarboxylic acid employed or the specific proportions or reaction conditions recited.

Example I

About 58 parts of allyl gamma-oxy-pentanoate (allyl levulinate) is heated with 30 parts of trioxane and about 3 parts of concentrated hydrochloric acid in a sealed glass tube for 4 hours according to the schedule:

1 hr., 125° C.
1 hr., 195° C.
1 hr., 225° C.
1 hr., 195° C.

At the end of the heating the reaction mixture is a viscous, dark liquid. The liquid shows good air drying properties and after a few hours heating with benzoyl peroxide forms a resin having a hard, flexible surface having resistance to organic solvents and acids.

Example II

About 45 parts of diallyl - gamma - acetyl - gamma - isopropenyl pimelate is heated with about 10 parts of paraformaldehyde in a sealed glass tube without the presence of a condensation catalyst. The temperature is maintained for about 5 hours at approximately 180° C. The resulting product is a viscous, light-brown liquid which gives on distillation 23 parts of a soft, brown resin. A portion of this product is polymerized readily to a hard, flexible resin having a general resistance to chemical action.

Example III

About 44 parts of diallyl - gamma - acetyl - gamma - isopropenyl pimelate is heated with about 10 parts of trioxane and about .25 part of zinc chloride in a sealed tube for about 5 hours at approximately 180° C. The product was a viscous liquid. The mixture is then shaken with toluene and water and distilled. The product showed exceptionally good air drying properties and readily polymerized with about 2% benzoyl peroxide to a resin having a hard, flexible, infusible surface.

Example IV

About 58 parts of dimethallyl-gamma-ketopimelate is heated with about 28 parts of paraformaldehyde in a sealed tube with about 3 parts of concentrated hydrochloric acid for 4 hours according to the schedule shown in Example I. At the end of the heating period the reaction product is a viscous liquid which gives on distillation a soft, light brown resin. The resin shows air drying properties and is readily polymerized with about 2% benzoyl peroxide and heat at 65° C. to a hard, flexible, infusible resin.

Example V

About 55 parts of diallyl gamma - acetyl - gamma-ethyl azelate is heated with about 15 parts of trioxane and about .3 part of zinc chloride in a sealed tube for about 5 hours at 180° C. The resulting viscous liquid is polymerized by heating at 65° C. with 2% benzoyl peroxide to form a hard, flexible, infusible resin with a general resistance to chemical action.

Example VI

About 45 parts of the following ketocarboxylic acid esters are heated with about 10 parts of paraformaldehyde and about .3 part of zinc chloride in a sealed tube according to the procedure shown in Example I: dicrotyl gamma-hexanoyl-gamma-allyl suberate, cinnamyl gamma-isopropenyl - delta - oxy - pentanoate and diallyl gamma - octanoyl - gamma - ethyl pimelate. In each case a viscous liquid is obtained which readily polymerized to a hard, flexible, infusible resin.

We claim as our invention:

1. A polymer of the condensation product of 15% to 70% by weight of formaldehyde condensed with 85% to 30% by weight of diallyl-gamma - acetyl - gamma - isopropenyl pimelate.

2. A polymer of the condensation product of 5% to 95% by weight of formaldehyde condensed with 95% to 5% by weight of allyl levulinate.

3. A polymer of 15% to 70% by weight of formaldehyde condensed with 85% to 30% by weight of dimethallyl gamma-keto-pimelate.

4. A hard, flexible resin obtained by subjecting the polymer defined in claim 1 to the action of heat.

5. A polymer of the condensation product of 5% to 95% by weight of formaldehyde condensed with 95% to 5% by weight of a diester of (I) gamma - acetyl - gamma - isopropenyl pimelic acid and (II) a beta,gamma-monoolefinic, monohydric aliphatic alcohol containing from 3 to 18 carbon atoms.

6. A polymer of the condensation product of 5% to 95% by weight of formaldehyde condensed with 95% to 5% by weight of a partially polymerized diester of (I) gamma - acetyl - gamma-isopropenyl pimelic acid and (II) a beta, gamma-monoolefinic, monohydric aliphatic alcohol containing from 3 to 18 carbon atoms.

7. A hard resin obtained by subjecting the polymer defined in claim 5 to the action of heat.

8. A polymer of the condensation product of 5% to 95% by weight of formaldehyde condensed with 95% to 5% by weight of an ester of (I) a ketomonocarboxylic acid wherein the carboxyl group is separated from the keto group by a chain of three aliphatic carbon atoms, and (II) a beta, gamma-monoolefinic, monohydric aliphatic alcohol containing from 3 to 18 carbon atoms.

9. A hard resin obtained by subjecting the polymer defined in claim 8 to the action of heat.

10. A polymer of the condensation product of 5% to 95% by weight of formaldehyde condensed with 95% to 5% by weight of a diester of (I) a ketodicarboxylic acid wherein one of the carboxyl groups is separated from the keto group by a chain of three aliphatic carbon atoms, and (II) a beta-gamma-monoolefinic, monohydric aliphatic alcohol containing from 3 to 18 carbon atoms.

11. A hard resin obtained by subjecting the polymer defined in claim 10 to the action of heat.

12. A polymer of the condensation product of 5% to 95% by weight of formaldehyde condensed with 95% to 5% by weight of a neutral ester of (I) an acid of the group consisting of the keto-monocarboxylic acids wherein the carboxyl group is separated from the keto group by a chain of three aliphatic carbon atoms, and ketodicarboxylic acids wherein at least one of the carboxyl groups is separated from the keto group by a chain of three aliphatic carbon atoms, and (II) a monohydric aliphatic alcohol possessing a single olefinic group between two aliphatic carbon atoms, one of said carbon atoms being not more than two carbon atoms removed from the carbon atom bearing the hydroxyl group.

13. A hard resin obtained by subjecting the polymer defined in claim 11 to the action of heat.

EDWARD C. SHOKAL.
PAUL A. DEVLIN.

REFERENCES CITED

The following references are of record in the file of this patent:

UNITED STATES PATENTS

| Number | Name | Date |
|---|---|---|
| 2,277,479 | D'Alelio | Mar. 24, 1942 |
| 2,325,376 | D'Alelio | July 27, 1947 |